United States Patent

Matsumura et al.

[11] Patent Number: 5,915,494
[45] Date of Patent: Jun. 29, 1999

[54] POWER TRAIN ARRANGEMENT STRUCTURE FOR VEHICLES

[75] Inventors: Kouji Matsumura; Tsuneki Wakamatsu, both of Toyota; Toshiaki Matsumoto, Okazaki; Mikio Ohashi, Nisshin; Junichi Harada, Nishikamo-gun; Atsumasa Matsui, Toyota, all of Japan

[73] Assignee: Toyota Jidosha Kabushiki Kaisha, Toyota, Japan

[21] Appl. No.: 08/687,326

[22] PCT Filed: Dec. 1, 1995

[86] PCT No.: PCT/JP95/02456

§ 371 Date: Aug. 7, 1996

§ 102(e) Date: Aug. 7, 1996

[87] PCT Pub. No.: WO96/18516

PCT Pub. Date: Jun. 20, 1996

[30] Foreign Application Priority Data

Dec. 14, 1994 [JP] Japan .................................... 6-333038

[51] Int. Cl.$^6$ ....................................................... B60K 5/04
[52] U.S. Cl. ........................................... 180/232; 180/297
[58] Field of Search ..................................... 180/297, 291, 180/292, 299, 232

[56] References Cited

U.S. PATENT DOCUMENTS

| | | | |
|---|---|---|---|
| 4,648,476 | 3/1987 | Roe et al. ........................... | 180/297 X |
| 5,129,476 | 7/1992 | Kikuchi et al. ...................... | 180/297 X |
| 5,222,573 | 6/1993 | Kameda et al. ......................... | 180/297 |
| 5,251,720 | 10/1993 | Hasetoh et al. ........................ | 180/297 |
| 5,257,675 | 11/1993 | Araki et al. ............................... | 180/297 |
| 5,287,942 | 2/1994 | Maebayashi et al. .................. | 180/297 |
| 5,360,079 | 11/1994 | Ichikawa et al. ...................... | 180/297 |

FOREIGN PATENT DOCUMENTS 2-231228  9/1990  Japan .

*Primary Examiner*—J. J. Swann
*Assistant Examiner*—Michael Mar
*Attorney, Agent, or Firm*—Oblon, Spivak, McClelland, Maier & Neustadt, P.C.

[57] ABSTRACT

A power train arrangement structure for a vehicle, in which an engine and a transaxle for transmitting the drive power outputted from the engine to the axles of front wheels are so arranged in an engine room at the front side of a vehicle body as to have their individual axes in the widthwise direction of the vehicle and in which lower arms for holding the front wheels are supported at two portions in the longitudinal direction of the vehicle. This arrangement structure is characterized in that the foremost end positions of the engine and the transaxle, as taken in the longitudinal direction of the vehicle, are generally aligned with the foremost end positions of the lower arms, as taken in the longitudinal direction of the vehicle, and in that the rearmost end positions of the rigid portions of the engine and the transaxle, as taken in the longitudinal direction of the vehicle, are generally aligned with the rearmost end positions of the lower arms, as taken in the longitudinal direction of the vehicle. Thus, the engine room can be shortened while sufficiently retaining the crush stroke of an FF car.

16 Claims, 9 Drawing Sheets

POWER TRAIN ARRANGEMENT STRUCTURE FOR VEHICLES

TECHNICAL FIELD

The present invention relates to a power train arrangement structure for a vehicle such as a car and, more particularly, to an arrangement structure for a propelling system such as an engine or a motor and a power transmission system, and apparatuses attached thereto.

BACKGROUND ART

An FF (i.e., Front-engine and Front-drive) car and an RR (i.e., Rear-engine and Rear-drive) car are known as the vehicle in which the power train including an engine, a coupling such as a clutch or a torque converter, a transmission for setting a gear stage and a differential for differentiating the left and right front wheels is entirely mounted in a limited space such as an engine room. Various influences may be exerted upon the characteristics of the vehicle by how to arrange the power train.

In the invention disclosed in JP-A-2-231228, for example, the engine, the transmission and the differential are sequentially arranged with deviations from the front to the back of the vehicle, and the engine is inclined backward. With this structure, the center of gravity of the power train is set at the rear side so that the load distribution to the front wheels is lightened. Moreover, the vehicule body can be lowered to improve aerodynamic characteristics. Still moreover, the engine is positioned in the foremost portion and inclined backward to raise another advantage that the compartment space is not reduced.

Incidentally, the front or rear portion of the vehicle body is the portion which performs an important function to crush at the time of a collision thereby to absorb the collision energy. In the invention, as disclosed in the aforementioned publication, the large length of the power train, as taken in the longitudinal direction of the vehicle, makes it difficult to retain the crush stroke for the collision unless the engine room is enlarged in the longitudinal direction. As a result, the overall length of the vehicle body may possibly be increased to enlarge the size of the vehicle.

In the aforementioned structure of the prior art, the transmission and the engine are arrayed sequentially at the front side of the vehicle body with respect to the axis of the differential which is arranged in the vicinity of the center axis of the front wheels. This arrangement positions the engine with a large forward deviation with respect to the center axis of the front wheels. On the other hand, lower arms supporting the front wheels are connected to suspension members at their two front and rear portions near the center axis of the front wheels so that their rear end portions are positioned at the back of the rear end position of the differential forming part of the power train.

These power train and lower arms are highly rigid members and will not crush basically at the time of a front collision so that they hardly absorb the energy of the front collision. The length excepting those longitudinal dimensions provides the crush stroke. In the aforementioned structure of the prior art, therefore, the dimension from the leading end portion of the engine to the rear end portions of the lower arms is left as the dead length which cannot absorb the energy of the front collision. The crush stroke for the vehicle body to crush has to be retained in addition to that dead length so that the length required of the engine room is enlarged. This raises a disadvantage that the overall length of the vehicle body is increased.

A main object of the present invention is to provide a power train arrangement structure capable of decreasing the overall length of a vehicle while retaining the crush stroke.

DISCLOSURE OF THE INVENTION

The present invention contemplates to provide a power train arrangement structure for a vehicle, in which a propelling system and a power transmission system for transmitting the power outputted from the propelling system to the axles are so arranged in a propelling system mounting chamber disposed in front of or at the back of a driver's compartment as to have their individual axes in the widthwise direction of the vehicle, and in which lower arms for holding the wheels are supported at two portions in the longitudinal direction of the vehicle. The power train arrangement structure of the present invention comprises rigid portions, which are included in the propelling system and the power transmission system and are set such that their end position, as located at the side opposed to the compartment in the longitudinal direction of the vehicle, is set not to exceed the end position of the lower arms, as located at the side opposed to the compartment in the longitudinal direction of the vehicle, apart from the compartment, and such that their end position at the side of the compartment is set not to exceed the end position of the lower arms, as located at the side of the compartment in the longitudinal direction of the vehicle, toward the compartment.

Here, the rigid portions include not only the integrated highly strong portions such as the engine block, the cylinder head, the body portion of the transaxle or the motor in an electric car but also a metallic intake manifold or exhaust manifold and further a highly strong accessory, as attached substantially immovably such as the alternator.

Since the rigid portions of the propelling system and the power transmission system are arranged within the dead stroke, i.e., the non-crushable area which is indispensable for the requirement of strength, the area which will not crush at the time of a longitudinal collision can be minimized. As a result, the propelling system mounting chamber can be shortened to reduce the size and weight of the vehicle while sufficiently retaining the crush stroke (i.e., the area that will crush at the time of a collision) functioning as the area for absorbing the collision energy.

According to the present invention, there is also provided a power train arrangement structure for a vehicle, in which a propelling system and a power transmission system for transmitting the propelling power outputted from the propelling system to the axles are so arranged in a propelling system mounting chamber separated from the driver's compartment by a partition member and formed at the front side or the rear side of the vehicle body, as to have their individual axes in the widthwise direction of the vehicle, wherein the propelling system is arranged over the power transmission system, wherein the end position of the rigid portion of the propelling system at the side opposed to the compartment, as taken in the longitudinal direction of the vehicle, is set not to exceed the end position of the rigid portion of the power transmission system at the side opposed to the compartment, as taken in the longitudinal direction of the vehicle, apart from the compartment, wherein the lower portion of the partition member retracts toward the compartment, and wherein the horizontal spacing between the end position of the rigid portion of the propelling system at the side of the compartment and the partition member is set to exceed the horizontal spacing between the end position of the rigid portion of the power transmission system at the side of the compartment and the partition member.

As a result, the space, as located below the partition member, can be effectively exploited to elongate the crush stroke. In addition, the space, as opposed to the compartment, of the propelling system and the power transmission system can be highly utilized as the crush stroke so that the propelling system mounting chamber can be reduced, while sufficiently retaining the overall crush stroke of the vehicle, thereby to reduce the size and weight of the vehicle.

In the present invention, moreover, the lower arms supporting the wheels are suspended by the suspension members, and either the portions of the suspension members or the mounting portions for mounting the suspension members on the vehicle body are provided with fragile portions. Since the suspension members suspending the lower arms are easily broken to come out at the time of a collision, the range, which corresponds to the length of the suspension members or the lower arms mounted on the former, will not act as the dead stroke against the collision and can be utilized as the crush stroke, so that those members can be prevented in advance to enter into the compartment.

According to the present invention, there is also provided a power train arrangement structure for a vehicle, in which a propelling system and a power transmission system for transmitting the propelling power outputted from the propelling system to the axles are so arranged in a propelling system mounting chamber separated from the driver's compartment by a partition member and formed at the front side or the rear side of the vehicle body, as to have their individual axes in the widthwise direction of the vehicle, in which left and right wheels are arranged at the two sides across the propelling system and the power transmission system, and in which strength members, as opposed to the outer circumferences of the rims of the wheels in the longitudinal direction of the vehicle are arranged at the two left and right sides of the partition member, wherein the end positions of the propelling system and the power transmission system at the side of the compartment, as taken in the longitudinal direction of the vehicle, are set to protrude toward the compartment from the rims of the front and rear wheels, as located at the side of the propelling system mounting chamber, and wherein the horizontal spacing between the end portions of the strength members and the end portions of the rims at the side of the compartment is set no more than the horizontal spacing between the end positions of the rigid members at the side of the compartment and the partition member.

As the wheels are moved together with the transmission toward the compartment in the longitudinal direction of the vehicle for a collision, the end portions of the rigid portions of the propelling system and the power transmission system at the side of the compartment come into abutment against the partition member between the propelling system mounting chamber and the compartment. Simultaneously with or prior to this abutment, the rims of the wheels come into abutment against the strength members such as the rocker panels (or side sills) protruding forward or backward from the two left and right sides of the partition member. As a result, the strength members are deformed by the collision load thereby to absorb the collision energy, before the power train including the propelling system and the power transmission system comes into abutment against the partition member. As a result, the number of members for absorbing the collision energy before the collision load exerts influences upon the compartment can be increased, and the yield strengths of the individual body portions can be effectively exploited to retain the collision safety of the vehicle by the light structure.

BEST MODE FOR CARRYING OUT THE INVENTION

Figure 1:
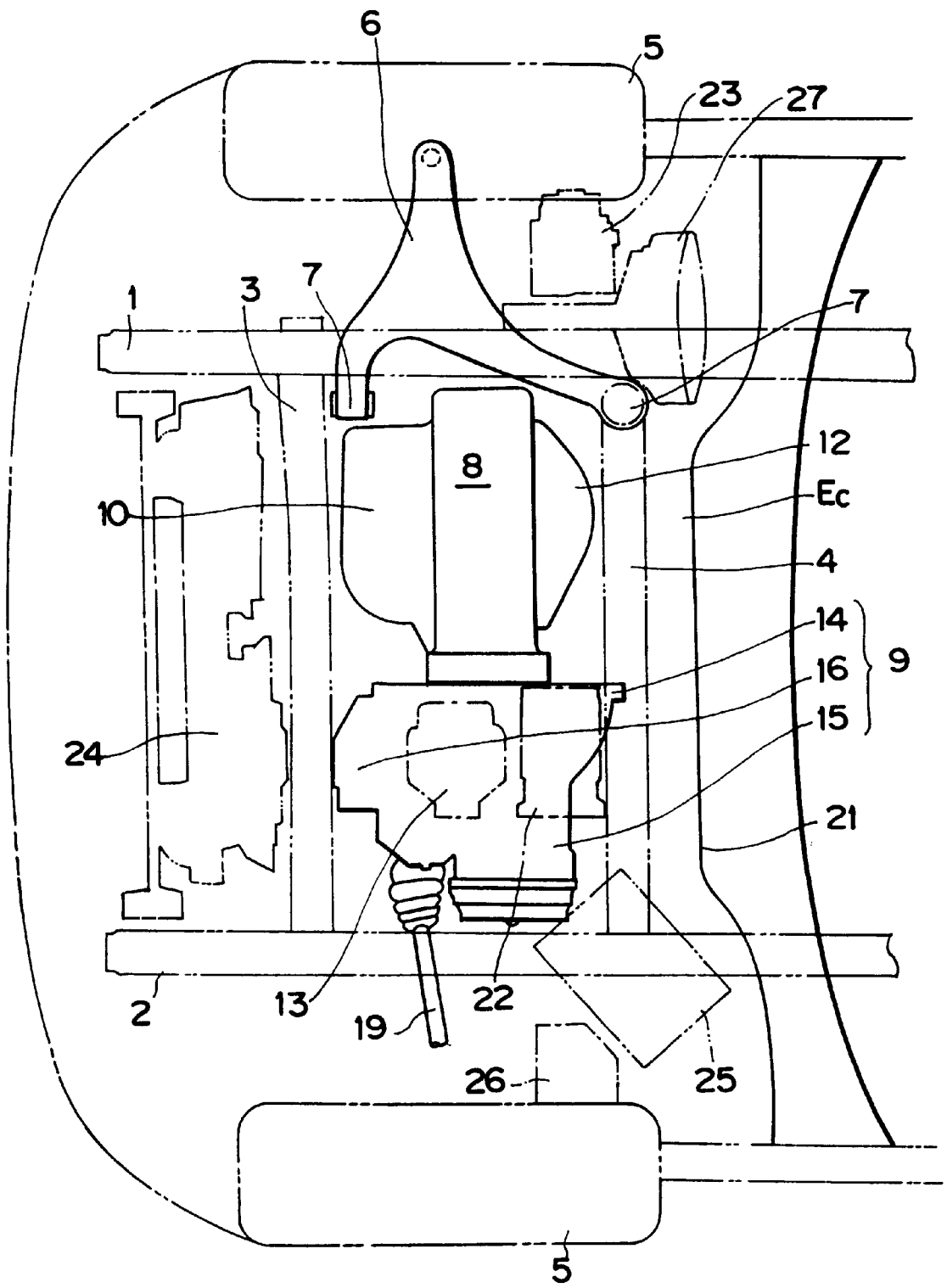
FIG. 1 is a top plan view showing one embodiment of the present invention.

Next, the present invention will be described in connection with its embodiments. FIG. 1 is a layout showing one embodiment of the present invention and presents the state in which the engine room Ec of an FF (i.e., Front-engine and Front-drive) car is viewed from above. Left and right side members 1 and 2 are arranged straight in parallel with each other and in the longitudinal direction of the car. To the two front and rear portions of the side members 1 and 2, as located in the engine room Ec, there are connected a pair of cross members (or suspension members) 3 and 4 which are extended in the widthwise direction of the car. These side members 1 and 2 and cross members 3 and 4 form a frame of parallel crosses.

Left and right front wheels 5 are individually supported by lower arms 6, although only one of them is shown in FIG. 1. This lower arm 6 is provided at its front and rear with two mounting portions 7, at which it is mounted on the car body. The front mounting portion 7 is connected to the front cross member 3 through a bushing, and the rear mounting portion 7 is connected to the rear cross member 4 through a bushing.

An engine 8 and a transaxle 9 acting as a power transmission system are arranged such that they will not protrude from the front and rear end portions of the lower arms 6 in the longitudinal directions of the car.

In other words, the engine 8 and the transaxle 9 are arranged to have their center axes in the widthwise direction of the car. The engine 8 is held through the (not-shown) engine mount by the side member 1 and the cross members 3 and 4 so that its rigid portion is confined between the front end portion and the rear end portion of the lower arm 6. Here, the rigid portion of the engine 8 is one which is manufactured on the premise that it will not crush at the time of a front collision. This rigid portion includes not only the engine block and the cylinder head but also metallic castings including an intake manifold 10 and an exhaust manifold 12 and an accessory such as an alternator 13. Incidentally, the parts, as constructed to allow the crushing, such as an intake manifold made of a synthetic resin are excluded from the rigid portions, even if they should be integrated with the engine 8, and may protrude forward or backward from the front or rear end portion of the lower arm 6. This exclusion applies to the accessory which is held by the (not-shown) relatively soft bracket. Then, the accessory may be arranged to protrude forward or backward from the front or rear end portion of the lower arm 6 but within the dimensions allowing the accessory to be moved forward and backward by the deformation of the bracket. With this structure, the front and rear end portions of the aforementioned manifold and bracket would protrude neither forward nor backward of the front and rear end portions of the lower arm 6 even if those manifold and bracket should crush into the engine 8.

Figure 2:
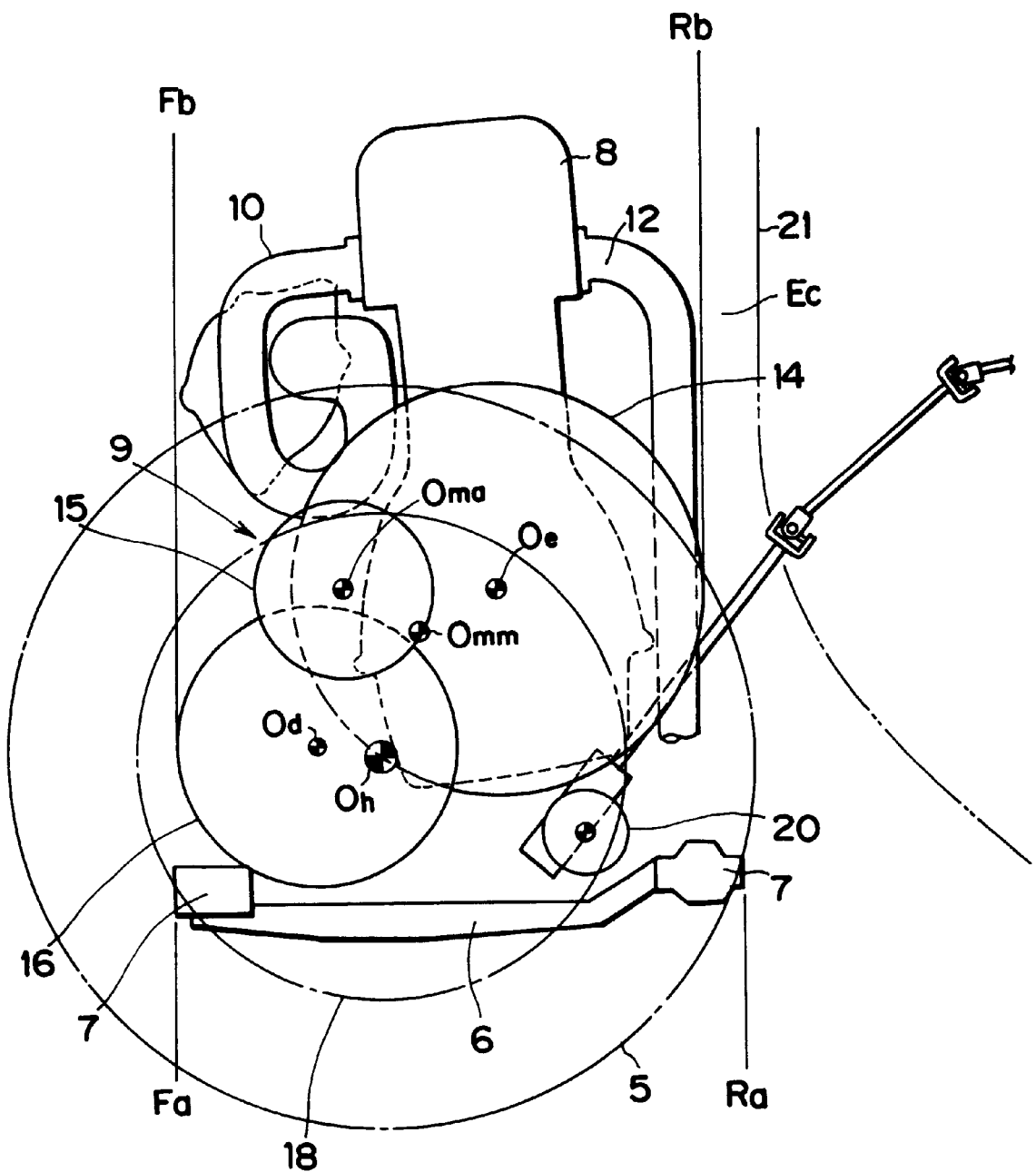
FIG. 2 is a schematic diagram for illustrating the relative positions, as taken in the longitudinal direction of a car, of the individual members shown in FIG. 1.

The transaxle 9 is the power transmission system which is constructed by integrating a coupling 14 such as a clutch or a torque converter, a transmission 15 and a differential 16. This transaxle 9 is connected to the engine 8 such that its center axis is arranged in the widthwise direction of the car. FIG. 2 shows the positional relations between the engine 8 and the transaxle 9 in the longitudinal direction of the car. The center axis of the coupling 14 is aligned with the center axis Oe of the (not-shown) crankshaft of the engine 8. The radially outermost position of this coupling 14 is located at the back of the rearmost portion of the rigid portion of the engine 8 and in front of the rear end portion of the lower arm 6. The center axis of the (not-shown) output shaft of the transmission 15 is indicated by letters Omm (for the automatic transmission) and by letters Oma (for the manual transmission). This center axis is positioned in front of the center axis of the coupling 14. The differential 16 is arranged in front of and below the engine 8, the coupling 14 and the transmission 15. The center axis of the differential 16 is indicated by letters Od. The radially outermost position of this differential 16 is generally aligned with the front end portion of the rigid portion of the engine 8 in the longitudinal direction of the car and is set not to protrude forward from the leading end portion of the lower arm 6.

In FIG. 2, on the other hand, reference numeral 18 designates the rims of the front wheels 5, the center axes of which are designated by letters Oh. The power is transmitted to the front wheels 5 from the aforementioned differential 16 through axles 19. A steering gear box 20 for steering those front wheels 5 is arranged below the engine 8 but slightly deviated backward from the center portion of the engine 8.

As a result, the foremost end position Fb of those rigid portions of the engine 8, the transaxle 9 and so on, which have such a high crushing strength that they will move backward as a block at the time of a front collision, is either generally aligned with or slightly deviated backward from the foremost end position Fa of the lower arms 6. On the other hand, the rearmost end position Rb of the rigid portions of the engine 8, the transaxle 9 and so on is located in front of the rearmost end position Ra of the lower arms 6. In short, the engine 8, the transaxle 9 and the steering gear box 20 are made substantially rigid and are arranged between the front and rear end portions of the lower arms 6 having the large dimension in the longitudinal direction. Put another way, positions Fb and Rb are confined between vertical planes which include positions Fa and Ra.

The engine room Ec confining the aforementioned engine 8 and transaxle 9 is separated from the driver's compartment by a dash panel 21 such that a predetermined spacing is retained between the foremost position of the dash panel 21 and the rearmost end position Rb of the aforementioned rigid portions. In this engine room Ec, there is arranged another accessory such as an air conditioning compressor 22, which is arranged over the transaxle 9 and in juxtaposition to the aforementioned alternator 13. Moreover, the rearmost end position of the compressor 22 is set not to protrude from the radially outermost position of the aforementioned coupling 14 toward the dash panel 21. An ABS (i.e., Anti-lock Brake System) actuator 23 is deviated transversely outward from the right side member 1. The actuator 23 is confined between the front and rear end portions of the lower arm 6 in the longitudinal direction of the car.

Incidentally, reference numerals 24, 25, 26 and 27 in FIG. 1 designate a radiator, a battery, a junction box and a brake booster, respectively.

With the arrangement and structure thus far described, therefore, the rigid portions such as those of the engine 8, the transaxle 9 and so on are arranged in such an area (or dead stroke) between the front end portion and the rear end portion of the lower arms 6, as will not crush at the time of a front collision. So the dead stroke is limited to the length between the front end portion and the rear end portion of the lower arms 6 and doesn't become longer. In other words, the aforementioned structure can set the dead stroke, which will not crush at the time of a front collision, to the inevitably minimum dimension. As a result, the overall length of the engine room Ec can be shortened while sufficiently retaining the crush stroke that will absorb the collision energy through the crushing. Thanks to the aforementioned construction, the portion in front of the lower arms 6, that is, an area beginning at the one of the vertical planes farther from said driver's compartment than the other one of the vertical planes, and extending away from the driver's compartment, provides the crush stroke portion, i.e., the area which will crush at the collision time and is concentrated at the front side of the car body so that the side members 1 and 2 are axially compressed stably without any folding. As a result, it is possible to increase the absorption of the collision energy.

Figure 3:
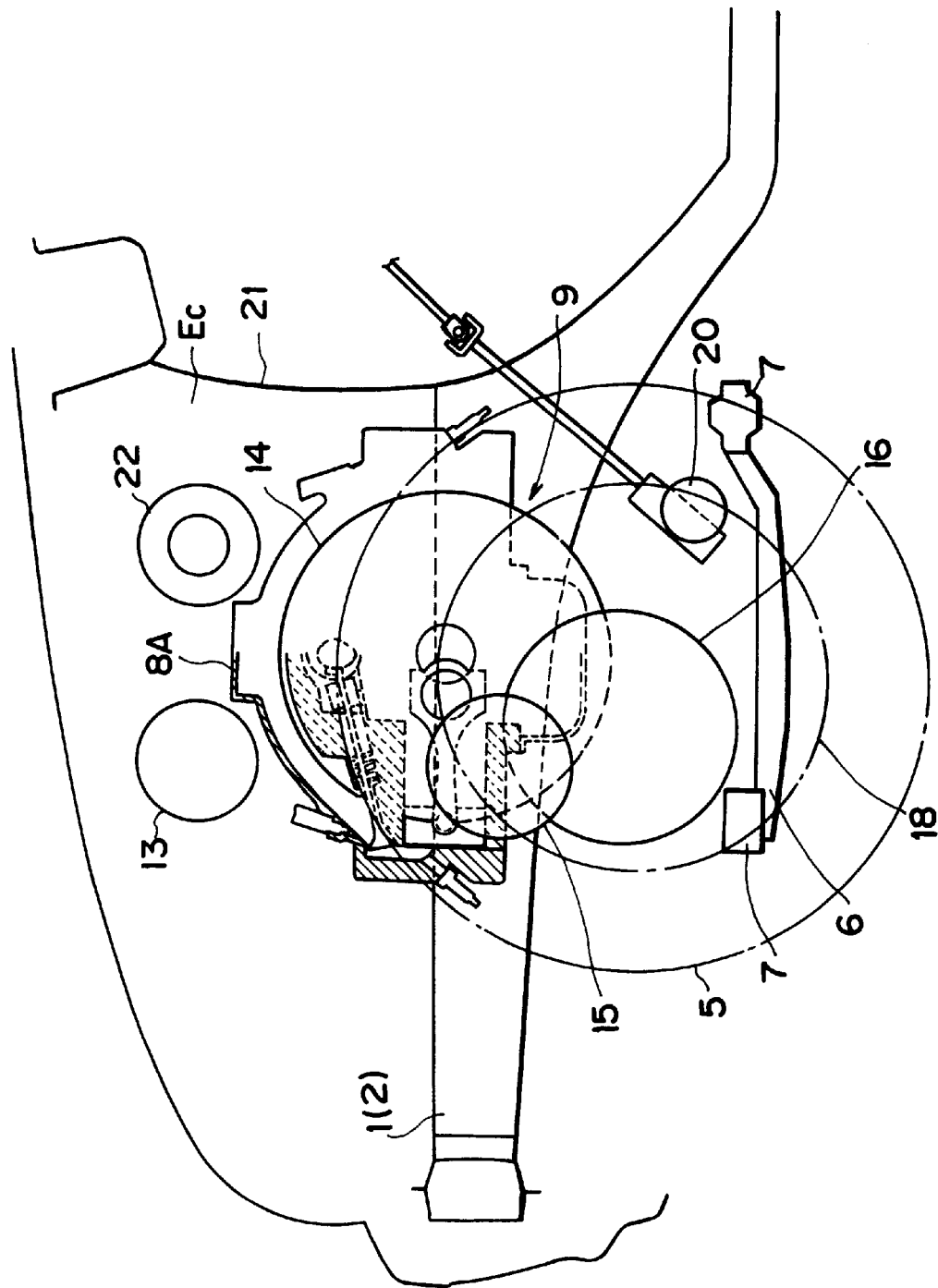
FIG. 3 is a schematic diagram similar to FIG. 2 but shows an example in which the engine is exemplified by a horizontal opposed type side valve engine.

The embodiment thus far described with reference to FIGS. 1 and 2 is exemplified by the OHC (i.e., Over Head Camshaft) type engine 8. This engine 8 is arranged upright so that its longitudinal dimension may be reduced. In the present invention, the engine of that type can be replaced by a horizontal opposed type engine, as shown in FIG. 3. Moreover, it is preferable that the horizontal opposed type engine 8 be embodied by a side valve type engine having a small-sized cylinder head, because its rigid portions are confined between the front end portion and the rear end portion of the lower arms 6, as described hereinbefore. Incidentally, the same reference characters of FIG. 3 as those of FIG. 2 designate the identical members.

Incidentally, the crush stroke at the front collision time is determined both by the length of the space in front of the rigid portions including the power transmission system such as the transaxle and the engine and by the dimension of the space between those rigid portions and the dash panel. In an embodiment shown in FIGS. 4 and 5, therefore, the crush stroke (i.e., the area to crush at the time of a collision) is retained by arranging the engine and the power transmission system in the following manner.

This power transmission system is constructed of the transaxle 9 including the coupling 14 such as the clutch or the torque converter, the transmission 15 and the differential 16 such as the final reduction gear. This transaxle 9 is arranged to have its axis in the widthwise direction of the car. The output shafts of these coupling 14, transmission 15 and differential 16 are deviated at their center positions from one another in the longitudinal direction of the car. Specifically, the radially outermost position of the coupling 14 defines the foremost end position Fb, and the radially outermost position of the differential 16 defines the rearmost end position Rb. This differential 16 is located at the lowermost position in the transaxle 9 and is protruded backward of the car.

The engine 8 is arranged in a higher position than the transaxle 9 and in the widthwise direction of the car and is connected to the aforementioned coupling 14. This engine 8 is exemplified by an OHC engine and is slightly inclined backward of the car. The intake manifold 10 of the engine 8 is made of a metallic casting, and its foremost end position is either generally aligned with or slightly deviated backward of the foremost end position Fb that is defined by the radially outermost position of the coupling 14. When this intake manifold 10 is made of a material having a low rigidity such as a synthetic resin, its foremost end position may protrude forward from the foremost end position Fb that is defined by the coupling 14. On the other hand, the exhaust manifold 12, as connected to the rear portion of the engine 8, is made of a metallic casting, and its rearmost end position in the engine room is located in front of the rearmost end position Rb of the rigid portion that is defined by the differential 16. In short, the engine 8 is confined between the foremost end position and the rearmost end position of the rigid portions of the transaxle 9. In this embodiment shown in FIGS. 4 and 5, too, the accessories such as the alternator 13, the air conditioning compressor 22 or the ABS actuator 23 are arranged like the engine 8 within the longitudinal dimensions of the transaxle 9.

Thus, the transaxle 9 is positioned below the engine 8, and its rearmost end position protrudes backward from the rearmost end position of the engine 8. On the other hand, the dash panel 21 is curved at its lower portion backward to the back of the car. Moreover, the spacing S1 (i.e., the distance taken in the horizontal direction) between the front face of the dash panel 21 and the rearmost end portion of the engine 8 is set at a value equal to or more than the spacing S2 (i.e., the distance taken in the horizontal direction) between the front face of the dash panel 21 and the rearmost end portion of the transaxle 9.

Figure 4:
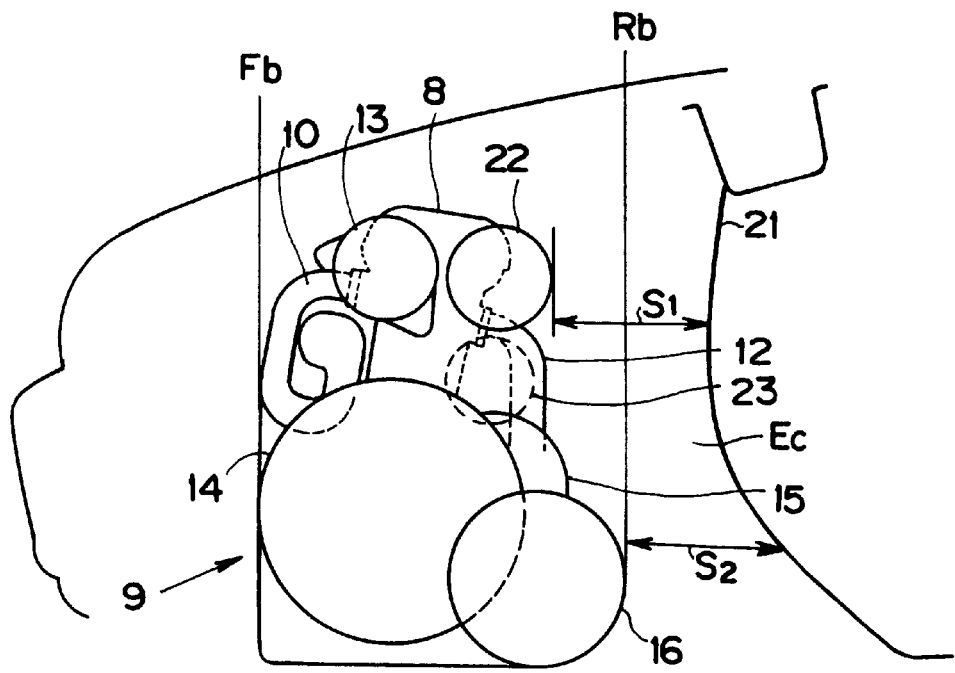
FIG. 4 is a schematic diagram for illustrating the relative positions, as taken in the longitudinal direction, of the individual members of a second embodiment of the present invention.
Figure 5:
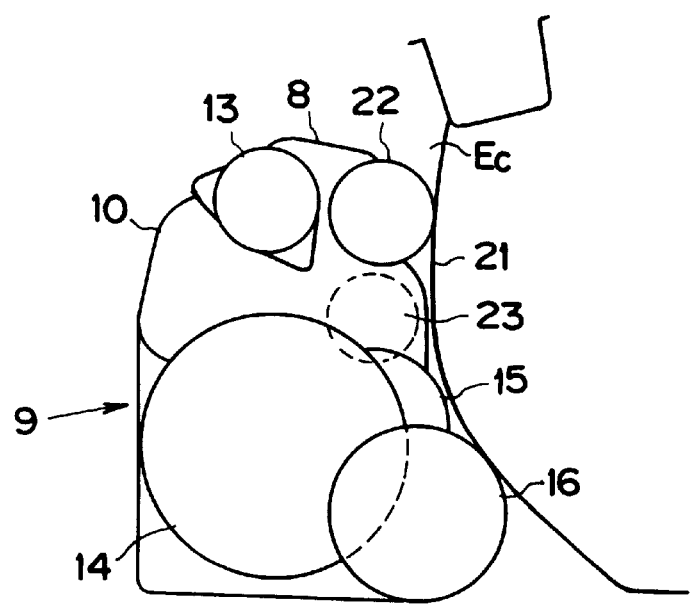
FIG. 5 is a schematic diagram showing the state in which the power train shown in FIG. 4 is moved to the dash panel.

FIG. 4 shows the normal state, and FIG. 5 shows the state in which the engine 8 and the transaxle 9 are retracted by a front collision. Since the engine 8 is positioned in front of the transaxle 9 with respect to the dash panel 21, as shown in FIGS. 4 and 5, the engine 8 is prevented from enterning into the compartment while deforming the dash panel 21, prior to the transaxle 9. In other words, the space, as formed backward of the car below the dash panel 21, is effectively utilized as the crush stroke. Incidentally, this crush stroke can be maximized if the above-specified spacings S1 and S2 are equalized.

With the construction shown in FIGS. 4 and 5, therefore, the foremost end positions of the individual rigid portions of the engine 8 and the transaxle 9 are generally aligned with each other so that their front sides can provide a space to be used as the crush stroke. In addition, the space at the back of those rigid portions can be most effectively utilized as the crush stroke. As a result, the engine room can be shortened while sufficiently retaining the overall crush stroke.

As described hereinbefore, the lower arms 6 supporting the front wheels 5 are arranged in the vicinity of the engine 8 and the transaxle 9 and are suspended by the suspension members that are mounted on the frame. These lower arms 6 and suspension members are made highly rigid and may move backward together with the engine 8 and the transaxle 9 in case these engine 8 and transaxle 9 are moved backward at the time of a front collision. As a result, the dead stroke, which will fail to provide the crush stroke capable of crushing to absorb the impact, is increased when the lower arms 6 and the suspension members are deviated in the longitudinal direction of the car with respect to the rigid portions of the engine 8 and the transaxle 9. In order to avoid this increase in the dead stroke, an embodiment shown in FIGS. 6 and 7 is so constructed that the suspension members may be removed from the frame by an impact load.

Figure 6:
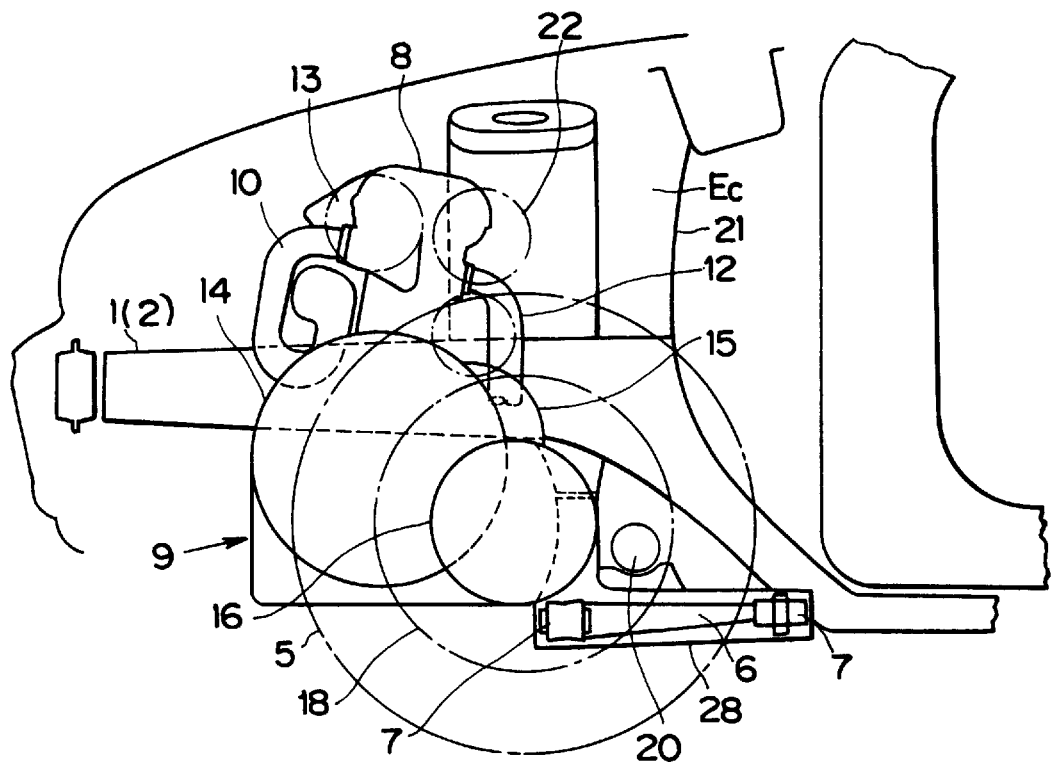
FIG. 6 is a schematic diagram for illustrating the relative positions, as taken in the longitudinal direction, of the individual members of a third embodiment of the present invention.
Figure 7:
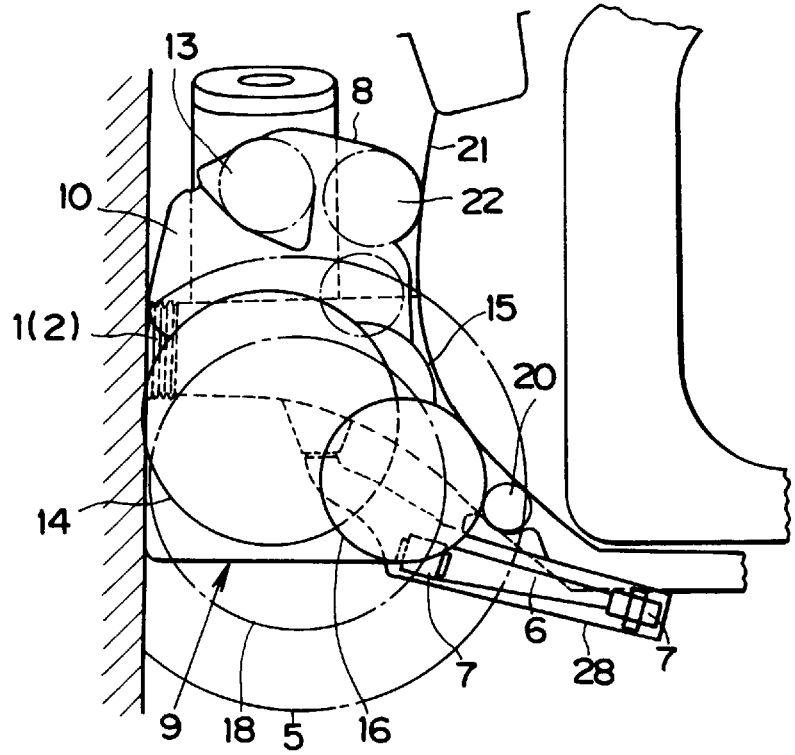
FIG. 7 is a schematic diagram showing the state in which the power train shown in FIG. 6 is moved to the dash panel.

Specifically, the embodiment shown in FIGS. 6 and 7 is constructed such that the engine 8 and the transaxle 9 are arranged, as shown in FIG. 4, whereas the lower arms 6 are deviated backward of the car from the transaxle 9. These lower arms 6 are connected at their two front and rear end portions to suspension members 28 through the (not-shown) bushings. These suspension members 28 are fixed at their two front and rear portions on the side members 1 and 2.

Figure 8:
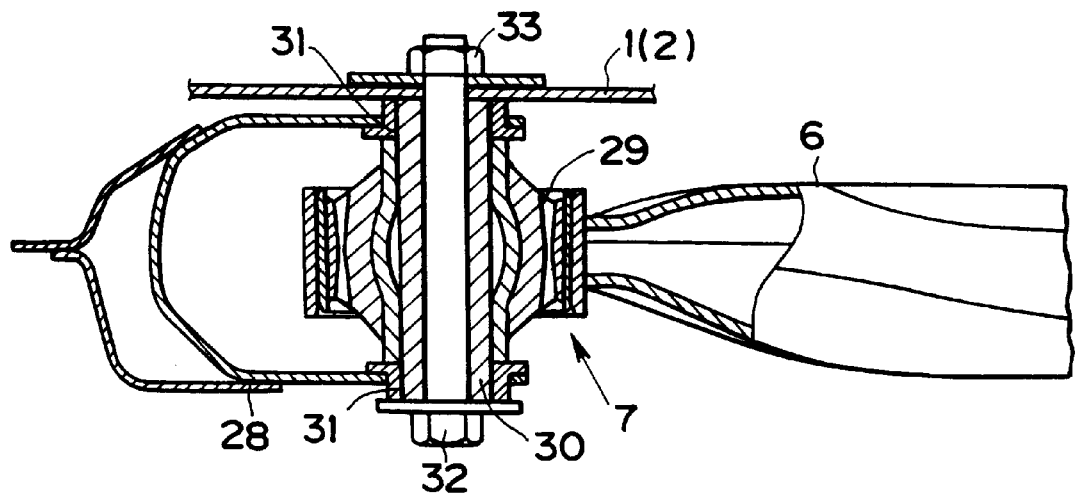
FIG. 8 is a section showing an example of a structure for mounting the lower arm and the suspension member, as shown in FIG. 6, on the frame.

FIG. 8 shows one example of the structure of the rear side fixed portion of one suspension member 28. A cylindrical bushing 29 is fitted on the end portion of the lower arm 6. Moreover, the portion of the suspension member 28 for mounting the lower arm 6 is formed to have a U-shaped section, into which is inserted the bushing 29. In this bushing 29, there is fitted a thick, cylindrical member or a collar 30, on the two end portions of which are fitted two flanged spacers 31. These spacers 31 are further fitted on the suspension member 28. In short, the lower arm 6 is connected to the suspension member 28 through the bushing 29, the collar 30 and the spacers 31. Into this collar 30, moreover, there is inserted from its one end portion a small type bolt 32 which has a leading end portion extending in the mounting portion of the front side member 1 or 2 until it is fastened by a nut 33 fixed on the inner face of that mounting portion. As a result, the suspension member 28 is fixed on the front side member 1 or 2 forming part of the frame by the bolt 32.

With the structure described above, therefore, the lower arm 6 and the suspension member 28 are connected to each other mainly by the thick collar 30, whereas the suspension member 28 and the side member 1 or 2 is connected to each other by the small type bolt 32. This structure makes the bolt 32 substantially fragile. As a result, this bolt 32 is broken to come out of the frame in case the suspension member 28 is pushed backward by the engine 8 and the transaxle 9 at the time of a front collision. FIG. 7 shows this state, in which the suspension member 28 acting as a strength member is prevented from transmitting the impact to the frame or entering into the compartment, so that the crush stroke is substantially increased.

Figure 9:
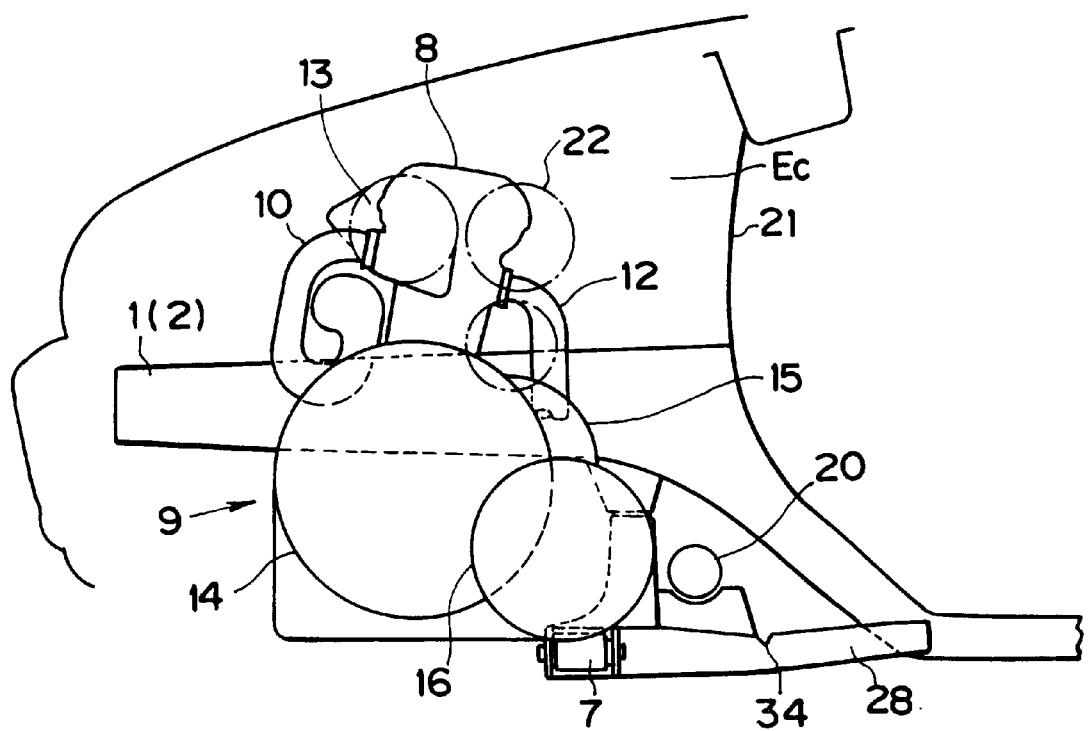
FIG. 9 is a schematic diagram for illustrating the relative positions, as taken in the longitudinal direction, of the individual members of a fourth embodiment of the present invention.
Figure 10:
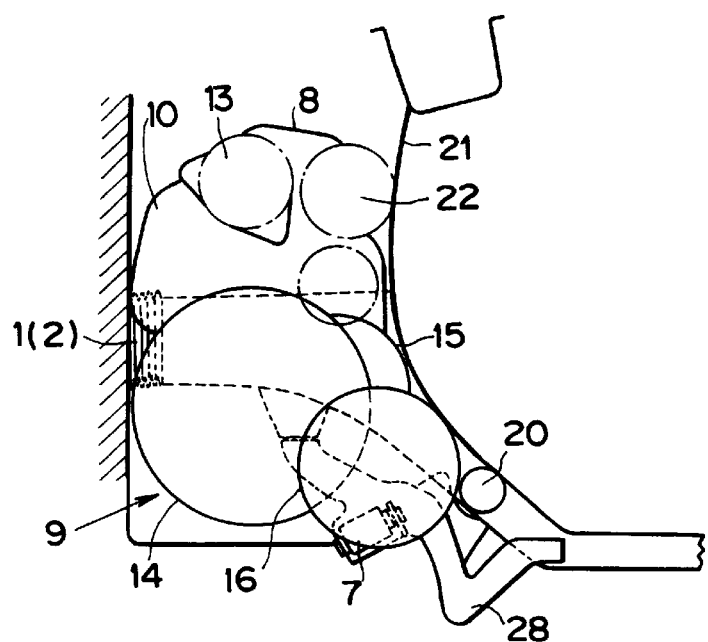
FIG. 10 is a schematic diagram showing the state in which the power train shown in FIG. 9 is moved to the dash panel.

Here, the fragile portion in the suspension member 28 need not be located at the aforementioned portion to be connected to the frame but may be exemplified by a construction, as shown in FIG. 9. Specifically, the suspension member 28 shown in FIG. 9 is slightly curved downward at its center portion, and this center portion is notched at 34 to provide the fragile portion. As a result, this suspension member 28 is folded downward in the vicinity of the notched portion 34, as shown in FIG. 10, when a longitudinal load caused by a front collision acts upon the suspension member 28. Like the construction shown in FIGS. 6 and 7, therefore, the suspension member 28 acting as the strength member can be prevented from transmitting the impact to the frame or entering into the compartment, so that the crush stroke is substantially increased.

Figure 11:
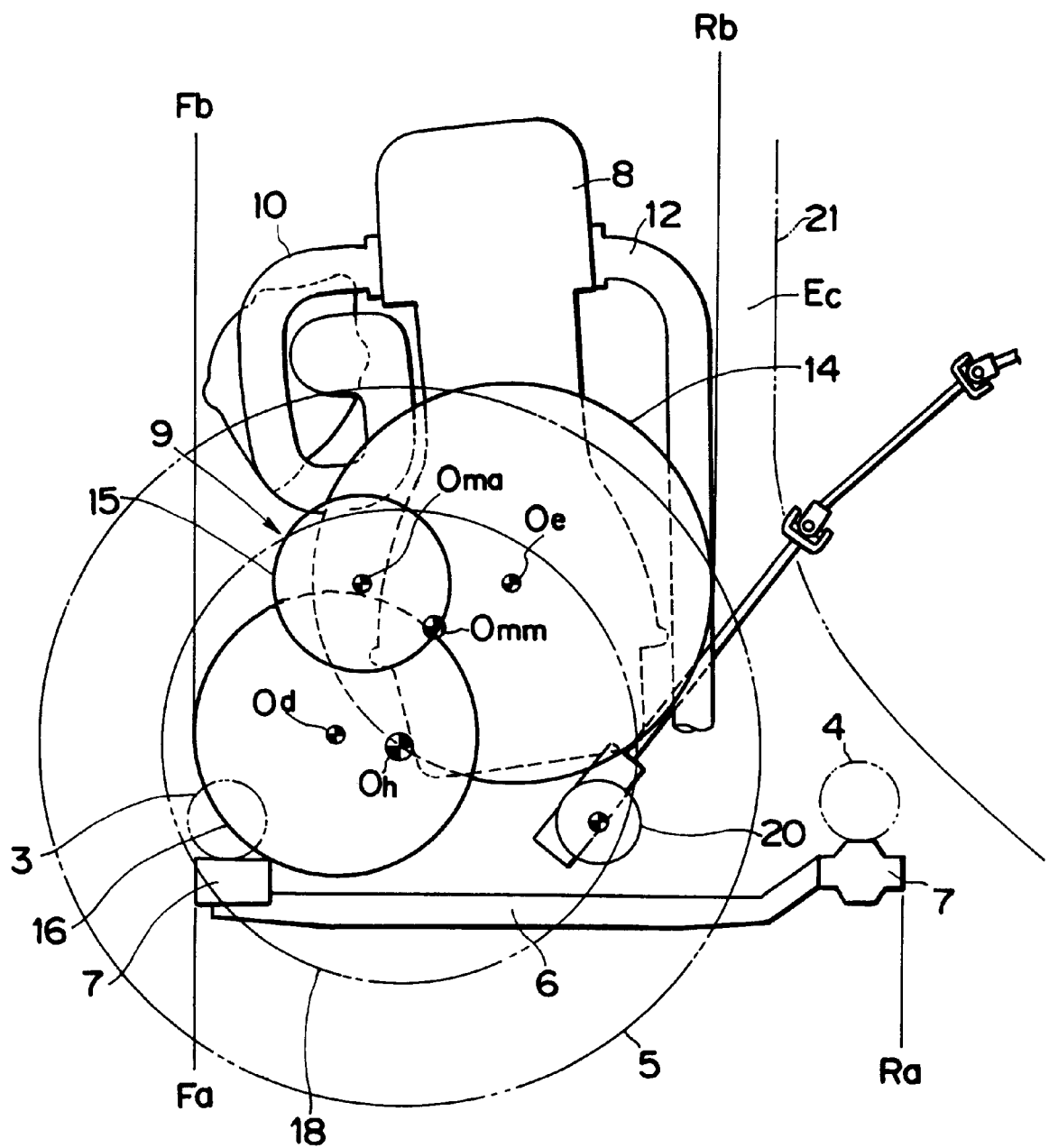
FIG. 11 is a schematic diagram showing an example, in which the rear end mounting portion of the lower arm is extended to the back of the rigid portions whereas the mounting portion for the suspension member is made of a fragile structure.

The fragile portion described above can also be adopted in the structure, in which the power train is confined within the dimensions of the lower arms, as taken in the longitudinal direction of the case, as shown in FIGS. 1 and 2. One example is shown in FIG. 11, in which the rear end portion of the lower arm 6 is extended backward of the car from the rearmost end position Rb of the rigid portions such as the engine 8 or the transaxle 9. In addition, the rear side cross member (or suspension member) 4 is arranged at the back of the rearmost end position Rb of the rigid portions such as the engine 8 or the transaxle 9. Moreover, the portion, at which the rear end portion of the lower arm 6 and the cross member 4 are mounted, is made of a fragile structure similar to the aforementioned one of FIG. 8.

Thanks to this structure, the mounting portion at the rear end side of the lower arm 6 is removed to come out of the cross member 4 by an impact load, so that the lower arm 6 can be prevented from coming into abutment against the dash panel 21 before the rigid portions such as the engine 8 or the transaxle 9 abut against the dash panel 21. In other words, the space, as left between the rigid portions such as the engine 8 or the transaxle 9 and the dash panel 21, effectively functions as the crush stroke.

For retaining the collision safety of the car, it is preferred that the collision load be received by as many structural members as possible before the engine 8, the transaxle 9 and so on enter into the compartment, so that the collision energy may be absorbed by the deformations of those structural members. From this standpoint, in an example shown in FIGS. 12 and 13, the load at the time of a front collision is applied to the rocker panels (or side sills), i.e., the strength members at the left and right sides of the car body.

Figure 12:
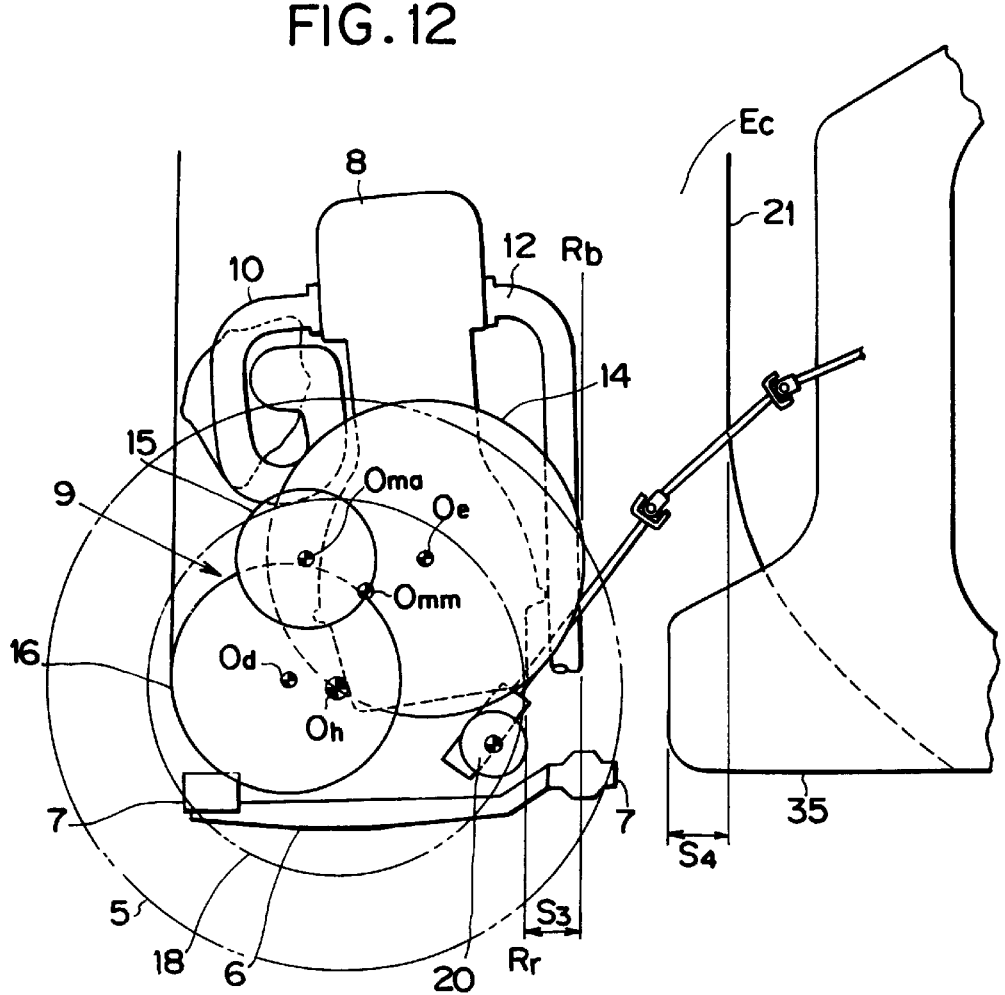
FIG. 12 is a schematic diagram for illustrating the relative positions, as taken in the longitudinal direction, of the individual members of a fifth embodiment of the present invention.
Figure 13:
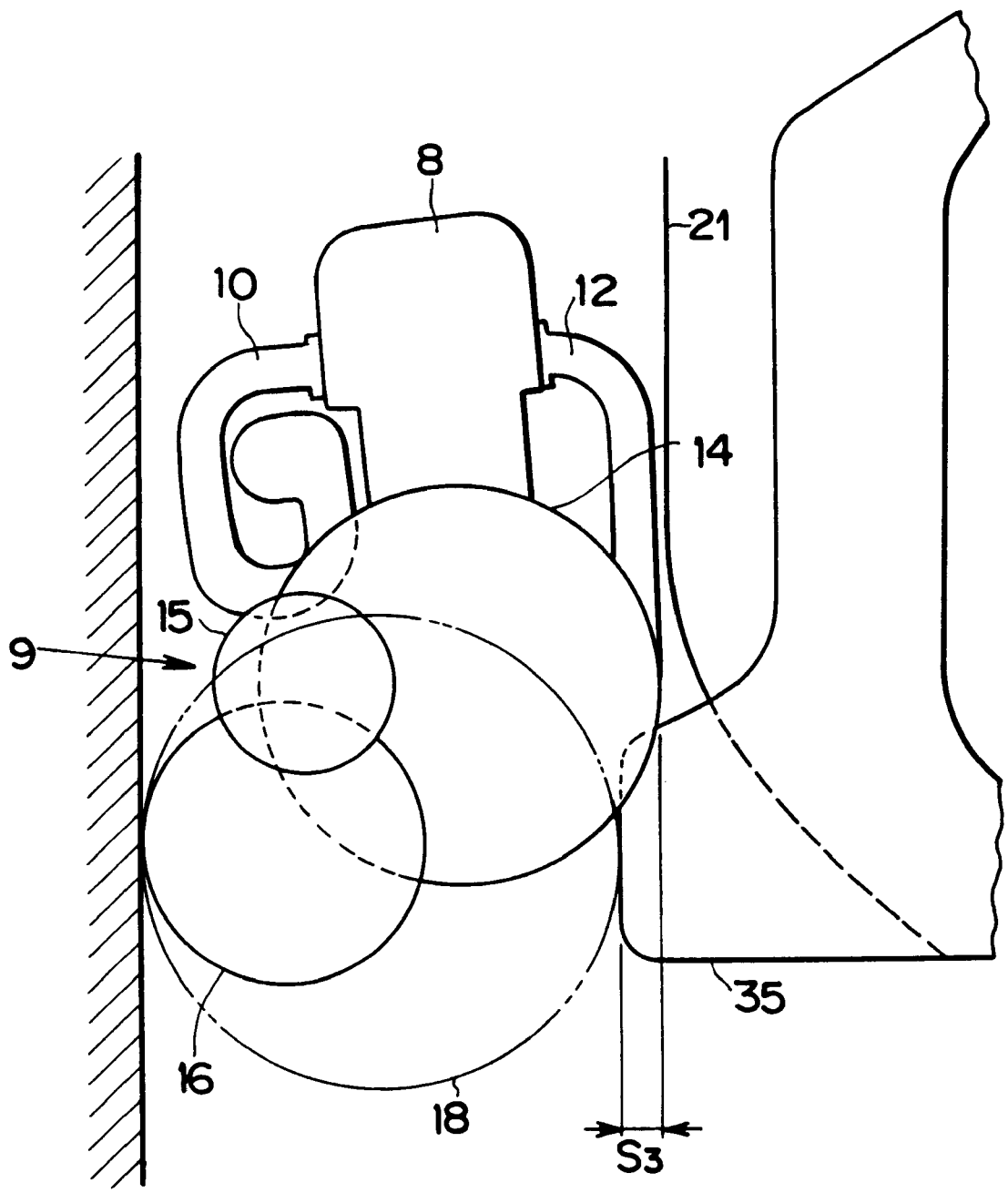
FIG. 13 is a schematic diagram showing the state in which the power train shown in FIG. 12 is moved to the dash panel.

In FIGS. 12 and 13, the engine 8, the transaxle 9 or the lower arms 6 are arranged as in FIGS. 1 and 2 so that the rearmost end portion of the power train, i.e., the rearmost end position Rb of the rigid portion of the engine 8 protrudes backward by a predetermined spacing S3 from the rearmost end position Rr of the rim 18. At the left and right sides of the dash panel 21, on the other hand, there are provided the rocker panels (or side sills) 35 or the members forming the skeleton of the car body. The leading end portion of each rocker arm 35 faces the rim 18 and protrudes forward from the front face of the dash panel 21 by the spacing S4 that is larger than the dimensional difference S3, as taken in the longitudinal direction, between the rearmost end position Rb of the aforementioned rigid portions and the rearmost end position Rr of the rim 18.

In the structure shown in FIG. 12, therefore, the rim 18 comes into abutment against the leading end portion of the rocker panel 35 before the rearmost end portion of the engine 8 abuts against the dash panel 21, as shown in FIG. 13, as the front wheel 5 is moved backward together with the engine 8, the transaxle 9 and so on by the front collision. As a result, the collision load is partially received by the rocker panel 35 and the structural member of the car body integrated with the former, before the dash panel 21 is deformed by the power train including the engine 8 and the transaxle 9. This deformation itself absorbs a portion of the collision load so that the deformation of the dash panel 21 and the accompanying influences upon the compartment can be reduced.

In the present invention, as exemplified in the foregoing individual embodiments, the engine is arranged in the widthwise (or transverse) direction so that its axial length is reduced. This makes it preferable to use an engine having four cylinders or so. The engine type to be adopted may be the straight type, the horizontal opposed type, the V-type or the narrow V-type. Incidentally, the steering gear box is arranged over the engine if the straight four-cylinder engine is inclined forward of the car. When the horizontal opposed type engine is used, a side valve type engine is preferable for shortening its dimensions in the longitudinal direction of the car. Moreover, the V-type engine is liable to take a large length when it is transversely arranged. In this application, the side valve type engine is preferred, too. The narrow V-type engine can be exemplified by the OHC type engine, because its dimensions in the longitudinal direction of the car approximate to those of the straight type engine even if the engine is transversely arranged. If the narrow V-type engine is highly inclined forward of the car, its steering gear box may have to be arranged over the engine, as in the case of the straight type engine.

The foregoing embodiments have been described in connection with the car on which is mounted the engine using the fossil fuel such as gasoline. Despite of this description, however, the present invention can also be applied to vehicles on which are mounted other propelling systems such as motors. Hence, these propelling system in the present invention should include not only the engines and their accessories but also the motors.

Moreover, the present invention can be applied to the RR cars in addition to the FF cars, as described in connection with the foregoing embodiments. When the present invention is applied to an RR car, the dash panel, as described in the embodiments, can be replaced by a partition between the driver's compartment and the propelling system mounting chamber. In this modification, moreover, the front end portion or the leading end portion, as taken in the longitudinal direction of the car, can be replaced by the end portion at the side opposed to the compartment, and the rear end portion can be replaced by the end portion at the compartment side.

In the present invention, as apparent from the description thus far made, the rigid portions such as the propelling system or the power transmission system are arranged within the dead stroke, i.e., the non-crushable area that is indispensable for the standpoint of strength, so that the area to be left as non-crushable even by a longitudinal collision can be minimized. As a result, the chamber mounting the propelling system can be shortened to reduce the size and weight of the car while sufficiently retaining the crush stroke to function as the area for absorbing the collision energy.

According to the present invention, furthermore, the end portions, as opposed to the driver's compartment, of the rigid portions of the propelling system and the power transmission system are generally aligned with each other such that the propelling system is arranged at a higher position than the power transmission system, and the spacing between the end position of the propelling system at the compartment side and the partition member is equal to or more than the spacing between the end portion of the power transmission system at the compartment side and the partition member. As a result, the space below the partition member can be effectively utilized to elongate the crush stroke. In addition, the space, as opposed to the compartment, of the propelling system and the power transmission system can be highly utilized as the crush stroke so that the propelling system mounting chamber can be made small, while sufficiently retaining the overall crush stroke of the car, thereby to reduce the size and weight of the car.

Since the suspension members are easily broken to come out at the time of a collision, according to the present invention, the range, which corresponds to the length of the suspension members or the lower arms mounted on the former, will not act as the dead stroke against the collision, and those members are prevented in advance from entering into the compartment.

In addition, the present invention is constructed such that the wheel rims are brought into abutment against the strength members of the car body as the wheels are moved toward the compartment at the collision time, thereby to apply the collision load to the strength members before the power train including the propelling system and the power transmission system comes into abutment against the partition member. This construction increases the number of members for absorbing the collision energy before the collision load exerts influences upon the compartment. As a result, the yield strengths of the individual body portions can be effectively exploited to retain the collision safety of the car by the light structure.

We claim:

1. A power train arrangement structure for a vehicle having a crushable zone at a longitudinal end thereof, in which a propelling system and a power transmission system for transmitting the power outputted from said propelling system to axles have at least rigid portions which are substantially non-crushable during a collision, in which the propelling system and the power transmission system are arranged in a propelling system mounting chamber disposed at said longitudinal end of the vehicle such that individual axes of the propelling system and the power transmission system extend in the widthwise direction of the vehicle, and the vehicle having a pair of laterally opposed rigid lower arms for holding a pair of wheels, each said lower arm having two ends supported at two longitudinally spaced portions of the vehicle, one of the two ends of both of said lower arms lying in a first vertical plane extending generally transverse to the longitudinal direction of the vehicle, the other of the two ends of both of said lower arms lying in a second vertical plane extending generally transverse to the longitudinal direction of the vehicle, wherein said power train arrangement structure comprises the propelling system, the power transmission system and said lower arms being arranged such that all of the substantially non-crushable, rigid portions of the propelling system and of the power transmission system are longitudinally confined between said first and second planes.

2. A power train arrangement structure of claim 1, wherein said vehicle has a driver's compartment, and wherein said crushable zone includes an area beginning at one of said vertical planes farther from said driver's compartment than the other one of said vertical planes, and extending away from said driver's compartment.

3. A power train arrangement structure of claim 1, further comprising a partition member separating a driver's compartment of said vehicle and said mounting chamber, further comprising wheel rims each having a circumference confined between said vertical planes, and further comprising strength members opposing said rims in the longitudinal direction of the vehicle.

4. A power train arrangement structure of claim 3, wherein ends of said strength members protrude from said partition member toward said rims.

5. A power train arrangement structure of claim 4, wherein a minimum horizontal spacing between said ends of said strength members and said rims is no greater than a minimum horizontal spacing between said lower arms and said partition member.

6. A power train arrangement structure according to claim 3,
   wherein said strength members include members forming the skeleton of the vehicle body.

7. A power train arrangement structure according to claim 1,
   wherein said propelling system includes an engine for generating the power by burning a fuel.

8. A power train arrangement structure according to claim 7,
   wherein said engine includes an overhead camshaft type engine.

9. A power train arrangement structure according to claim 7,
   wherein said engine includes a side valve type horizontal opposed engine.

10. A power train arrangement structure according to claim 1,
    wherein said propelling system includes a motor to be electrically energized for generating the power.

11. A power train arrangement structure according to claim 1,
    wherein said power transmission system includes at least one of a coupling, a transmission and a differential.

12. A power train arrangement structure according to claim 11,
    wherein said coupling includes a clutch.

13. A power train arrangement structure according to claim 11,
    wherein said coupling includes a torque converter.

14. A power train arrangement structure according to claim 1, further comprising:
    an accessory arranged in the longitudinal direction of the vehicle and between the two vertical planes.

15. A power train arrangement structure according to claim 14,
    wherein said accessory includes at least one of an alternator, an air conditioning compressor and an anti-lock brake system actuator.

16. A power train arrangement structure according to claim 1, further comprising:
    suspension members suspending said lower arms; and
    fragile portions formed partially in one of said suspension members and the portions of said suspension members, at which said suspension members are mounted on the vehicle body.

* * * * *